July 5, 1949.  R. A. GOEPFRICH ET AL  2,475,492
INTERNAL EXPANDING BRAKE
Filed April 17, 1944  3 Sheets-Sheet 1
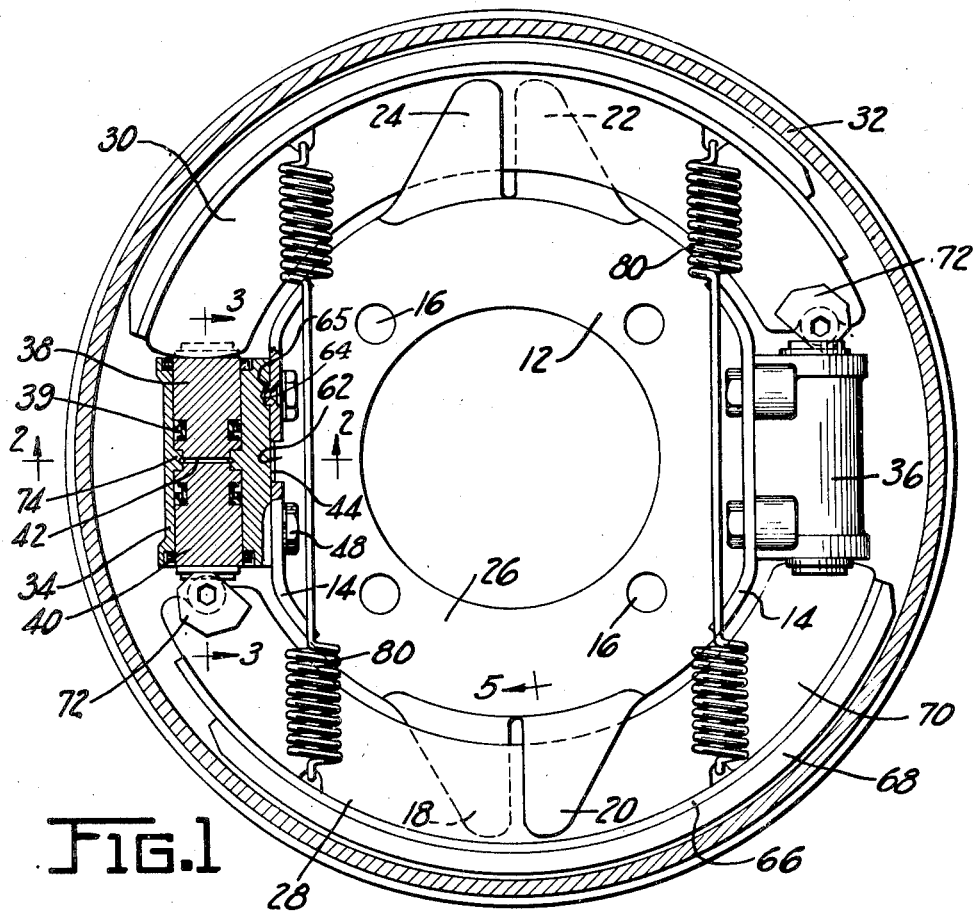
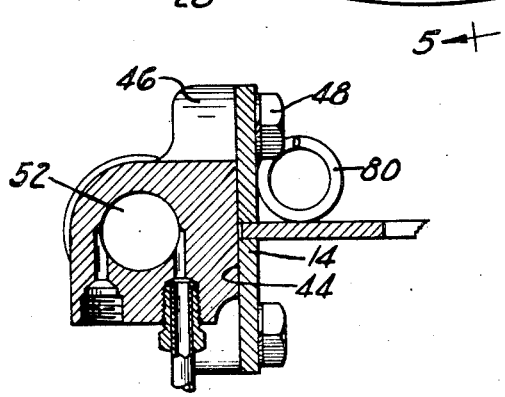
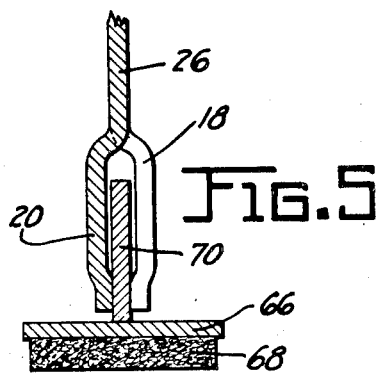
INVENTOR
BRYAN E. HOUSE
RUDOLPH A. GOEPFRICH
BY T. J. Plante
ATTORNEY July 5, 1949.  R. A. GOEPFRICH ET AL  2,475,492
INTERNAL EXPANDING BRAKE Filed April 17, 1944  3 Sheets-Sheet 2

INVENTOR
BRYAN E. HOUSE
RUDOLPH A. GOEPFRICH
BY T. J. Plante
ATTORNEY

July 5, 1949.  R. A. GOEPFRICH ET AL  2,475,492
INTERNAL EXPANDING BRAKE
Filed April 17, 1944   3 Sheets-Sheet 3

INVENTOR
BRYAN F. HOUSE
RUDOLPH A. GOEPFRICH
BY T. J. Plante
ATTORNEY

Patented July 5, 1949

2,475,492

UNITED STATES PATENT OFFICE 2,475,492

INTERNAL EXPANDING BRAKE

Rudolph A. Goepfrich and Bryan E. House, South Bend, Ind., assignors to Bendix Aviation Corporation, South Bend, Ind., a corporation of Delaware Application April 17, 1944, Serial No. 531,384

16 Claims. (Cl. 188—78)

This invention relates to brakes of the internal expanding shoe type, and more particularly to the structure which supports the shoes and other non-rotating parts of the brake and takes the anchoring torque of the shoes.

An object of the present invention is to provide improved support or torque reaction means for a brake structure.

A further object of the present invention is to provide an improved brake structure, wherein anchor deflection and supporting plate distortion are substantially eliminated.

In general, the objects of the present invention are similar to those of our previously filed copending application Serial No. 527,271, particularly with relation to mounting the shoes and actuating means centrally of the torque-taking member in order to avoid offset loading of said torque-taking member.

It is an object of the present invention to provide brake structure which will have the advantages of the brake disclosed in our above mentioned application and which is even simpler in construction than the device of said application, and is therefore less expensive and easier to manufacture.

Other objects and advantages of the present invention will become apparent during the course of the following description, reference being had therein to the accompanying drawings, in which:

Figure 1 is a side elevation, sectioned in part, showing a brake assembly which incorporates certain principles of our invention;

Figure 2 is a section taken on the line 2—2 of Figure 1;

Figure 5 is a section taken on the line 5—5 of Figure 1;

Figure 9:
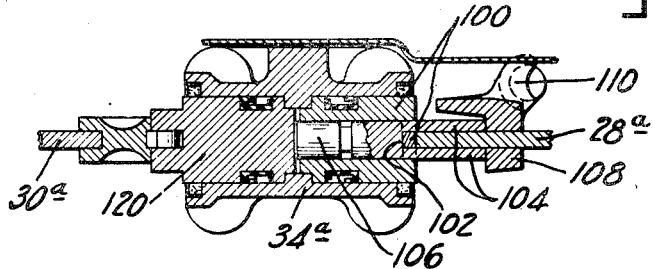
Figure 6:
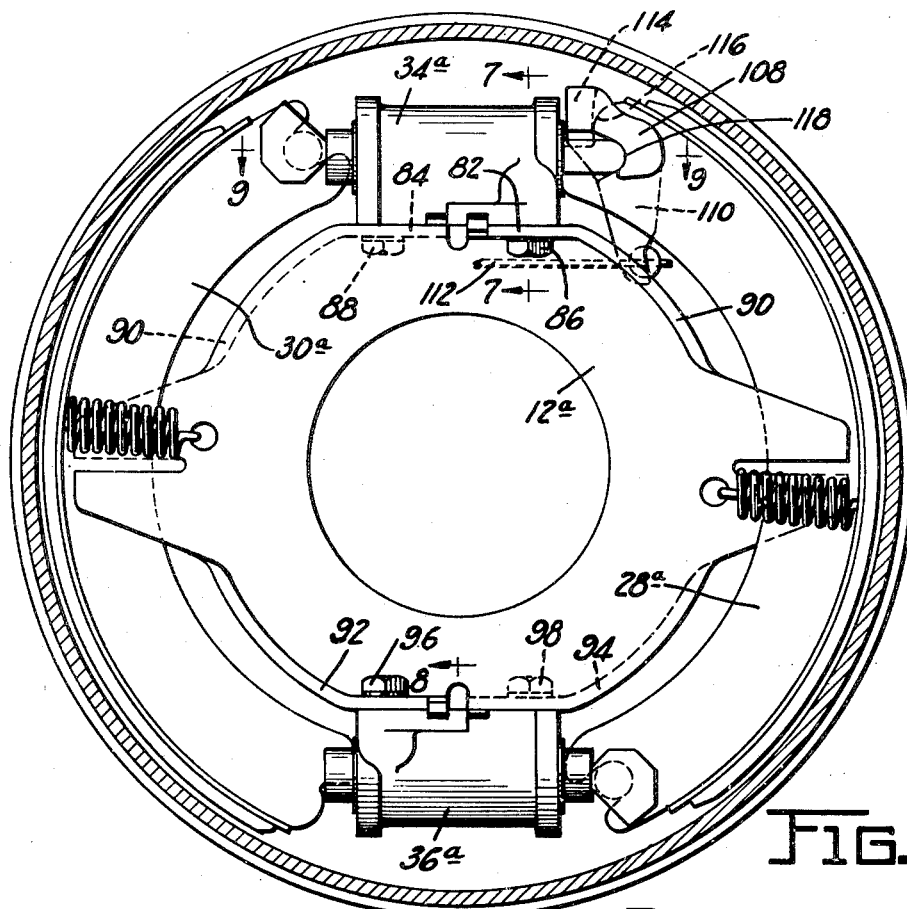
Figure 6 is a side elevation showing a brake assembly incorporating a modified version of our invention.
Figures 7, 8:
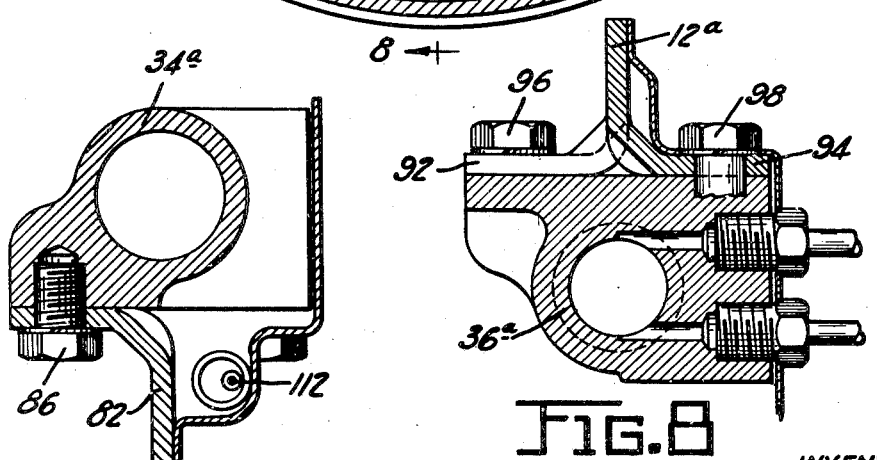

Figures 7, 8 and 9 are sections taken on the lines 7—7, 8—8 and 9—9 respectively of Figure 6.

The supporting plate or torque-taking structure of the present application differs from the torque-taking structure shown in our application Serial No. 527,271, primarily in accomplishing by the use of a single supporting plate the same function which requires a double supporting plate combination in the earlier application.

Heretofore, it has been assumed that two stampings or plates would be necessary to permit center anchoring or axial centering of the shoes, unless a cast structure similar to that shown in Frank Patent No. 2,038,213 was used. However, we have now conceived a brake support structure which requires only a single center plate, a part which can be formed by stamping, to do the job which formerly required either two plates or a casting.

Applying and anchoring means for the shoe or shoes of the brake must be mounted on the supporting structure. Where a single supporting plate is used, the members which actuate and anchor the shoes must either be secured directly to the supporting plate by means of bolts or the like extending normal to said plate, or must be supported on extensions of said supporting plate which are substantially normal to the plane of the central portion of the supporting plate. These axially extending or normal extensions may either be integral with the central portion of the supporting plate, or may be formed separately and secured to the plate. Said axially extending or normal extensions of the supporting plate are located at the periphery thereof.

In the brake assembly shown in Figs. 1 to 5 inclusive, the supporting structure comprises in general a plate-like member or spider 12 and one or more inverted cradles 14 extending in a plane normal to the plane of the plate-like member 12, and adapted to support the brake shoe actuating and anchoring means. The substantially flat plate-like portion 12 may conveniently be formed by a stamping process, and it is adapted to be secured to a fixed or non-rotating member, such as the axle housing or steering knuckle of an automotive vehicle, a plurality of openings 16 being provided to accommodate bolts or like fastening elements. In the instant case, the center portion of the plate-like member 12 is left open to accommodate a vehicle axle.

The stamping 12 is preferably provided with a plurality of substantially radially extending arms, which serve as guides for the webs of the brake shoes. In the present case four such arms, 18, 20, 22 and 24, are provided, all of which are slightly axially offset from the plane of the disk portion 26 of the plate-like stamping 12. The arms 18 and 22 are axially offset in one direction from the plane of stamping 12, whereas the arms 20 and 24 are axially offset in the opposite direction from the plane of stamping 12, arms 20 and 24 being offset upwardly as viewed in Figure 1, and arms 18 and 22 being offset downwardly as viewed in Figure 1.

For the purpose of illustration only, we have shown a brake having two shoes 28 and 30, each of which is individually shiftable to anchor at one end or the other depending upon the direction of rotation of the drum 32. This arrangement has been previously disclosed, and should be sufficiently well understood without further explanation. In order to actuate the shoes 28 and 30, we provide two hydraulic actuating cylinders 34 and 36 located at opposite sides of the brake assembly and between the ends of the shoes. The actuating devices 34 and 36 are mounted on the inverted cradles 14, which are in turn mounted on and supported by the plate-like supporting member 12.

Our invention is applicable to any type of brake, regardless of the actuating means used, and regardless of the pressure applying characteristics of the shoes. For example, the principles of our invention are equally applicable to the brake shown, which has two self-energizing shoes, to the Servo type of brake wherein the shoes are pivotally connected at one end and one shoe "serves" or applies the other, and to the "non-Servo" type of brake wherein the shoes are permanently anchored at one end and are spread apart at the opposite end, as well as to other brake arrangements.

We find it convenient to utilize the cylinders 34 and 36 as anchors for the shoes, as well as actuators. This again is, of course, not directly related to the present invention. Each actuating device 34 and 36 has a pair of pistons 38 and 40, which are adapted to be spread apart by fluid under pressure entering the central portion 42 of the cylinder. As the pistons 38 and 40 move outwardly they move the ends of the shoes into contact with the drum 32. Each of the pistons is provided with the customary sealing means 39.

The actuators 34 and 36 are preferably formed as castings, each having a flat base 44, as seen particularly in Figures 1 and 2, and having a plurality of offset ears 46 adapted to receive bolts 48 which clamp the actuators to the inverted cradles 14.

Figure 4:
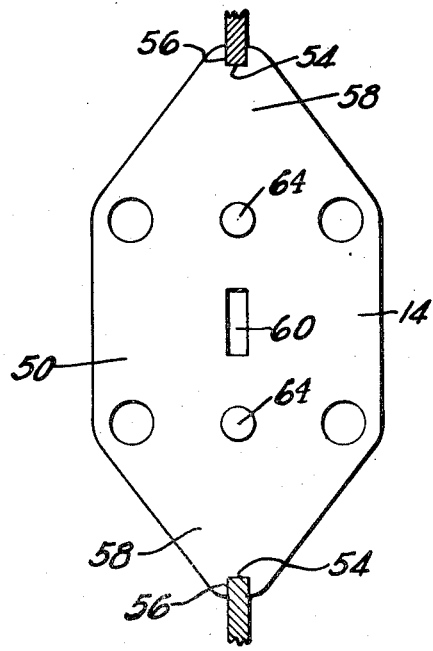
Figure 4 is a plan view of the inverted cradle or plate normal to the supporting plate of Figure 1, with the actuating device removed to show the plate more clearly.

A plan view of one of the inverted cradles 14, with the cylinder removed, is shown in Figure 4. Each of the cradles 14, which is adapted to be formed by a stamping process, has a flat relatively wide center portion 50 on which the actuator is mounted. The cradle stamping is normal to the plane of the stamping 12, and the arrangement is preferably such that the longitudinal axis of the cylinder bore 52 coincides with the longitudinal center of the cradle stamping and lies in the plane of the stamping 12. Preferably each cradle stamping is set in a peripheral recess formed in the stamping 12, the edges of this recess being indicated by the numeral 54. Additionally, a slot 56 may be provided in each end of each cradle to receive the respective edge of the stamping 12, and thereby provide additional support for the inverted cradle. By turning the ends 58 of each cradle inwardly toward the axis of the brake assembly, additional support is provided to prevent tipping or rocking of the cradle with respect to the stamping 12. An opening 60 may be provided at the center of each cradle to accommodate an outwardly extending locating projection 62 on the member 12. Furthermore, nibs 64 formed on the cradle may extend into depressions 66 in the actuator casting to aid in locating the same.

Prior to securing the combined actuating and anchoring devices 34 and 36 to the respective inverted cradles, the cradles should be secured to the center supporting member 12 in any suitable manner, for example, by means of arc welding, spot welding, or hydrogen brazing, the term welding being generic to the foregoing three methods.

Each of the shoes 28 and 30 comprises an arcuate rim portion 66 concentric with the drum and lined with friction material 68, and an inwardly extending web portion 70 normal to the rim, the shoes being ordinarily referred to as T-section shoes. It is intended that the web 70 of the shoes be in the same plane as the flat disk-like portion 26 of the primary supporting member 12, as illustrated in Figure 2. When the shoes anchor, the anchoring torque is transmitted from the shoe webs directly to the anchor members, as shown, except where an adjustor, such as the polygon adjustor 72, is located between the end of the shoe and the respective anchor member 34 or 36. The anchoring torque is transmitted by members 34 and 36 through the inverted cradles 14 to the primary supporting plate 12. Because the shoe webs lie in the center plane of said primary supporting plate 12, there is no offset anchoring load on said supporting plate, and the shoes are said to be "center mounted." With this construction, there can be no deflection of the anchors nor distortion of the supporting structure due to the anchoring torque of the shoes. In the present case the anchoring force is transmitted from the shoes to the pistons and thence to the anchor flanges 74 provided at the center of the hydraulic cylinders 34 and 36.

Figure 3:
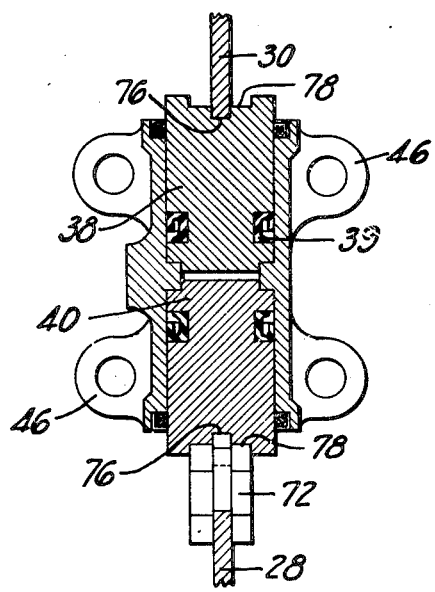
Figure 3 is a section taken on the line 3—3 of Figure 1.

The webs 70 of the shoes may be centrally guided between one pair of spider arms, as shown in Figure 5. This prevents lateral movement of the shoes relative to the center plane of the brake assembly. Additionally, the ends of the shoes may be guided in slots in the pistons of the hydraulic actuators. Referring to Figure 3, the left end of shoe 30 is seen guided in a slot 76 provided in piston 38. Since the adjustor 72 is between the left end of shoe 28 and piston 40, a wider but less deep groove 78 is provided in the piston to guide the edge of the adjustor. By providing the groove 76 at the center of the groove 78 in each piston, it is possible to use identical pistons, thus avoiding extra tooling cost. The right end of shoe 28 is guided in the same manner as the left end of shoe 30 and the right end of shoe 30 is guided in the same manner as the left end of shoe 28. Both ends of both shoes are adapted to slide toward or away from the drum, in order that the shoes may find their proper position during the time they are in contact with the drum and thereby obtain full effectiveness while avoiding uncontrollability of the brake due to gripping.

The shoes are resiliently maintained in released position, until actuating pressure is exerted by the hydraulic cylinders 34 and 36, by means of return springs 80, which interconnect the shoes to draw them toward the axis of the brake assembly and into contact with the ends of the respective pistons. It will be noted that the springs 80 are laterally offset from the plane of the shoe webs, thereby providing a force which urges the web of shoe 30 toward arm 24 and which urges the web of shoe 28 toward arm 20.

A method of obtaining support for the actuators or anchors, or combined actuators and anchors, without using the added inverted cradle members is shown in Figures 6 to 9. In this modification, the primary supporting member or spider 12a is provided with integral flanges extending normal to the plane of the member 12a and arranged to support the combined actuating and anchoring members 34a and 36a. Each of the members 34a and 36a is supported by two such flanges on the spider 12a, one of the flanges being turned in one direction from the spider, and the other being turned in the opposite direction. For example, in Figure 6, the flange 82 on the spider 12a is turned upwardly from the plane of the drawing, while the flange 84, also on the spider 12a, is turned downwardly from the plane of the drawing. The member 34a is secured to the spider by means of a bolt 86 which extends through the flange 82, and a bolt 88 which extends through the flange 84. Each of the flanges 82 and 84 preferably extends an appreciable distance along the periphery of the spider, having a tapered skirt portion 90 which gives added strength to the structure. The arrangement at the other side of the brake is the same as that just described. Here the flange 92 is turned upwardly from the plane of the drawing and the flange 94 is turned downwardly from the plane of the drawing, the bolt 96 extending through flange 92 into the casing of member 36a, and bolt 98 extending through flange 94 into the casing of member 36a.

Figures 6 to 9 illustrate a method of incorporating emergency or parking brake applying mechanism in the brake structure shown. Referring particularly to Figure 9, the piston 100 in member 34a has an opening extending from the inner end thereof as far as the wall portion 102. This wall portion is punched to form two slots, through which extend the arms 104 of a plunger 106, the body of which is reciprocable in the opening formed in piston 100. The end of the shoe 28a is adapted to anchor against the wall 102 of the piston between the slots through which the arms 104 of the plunger extend. The arms 104 of the plunger embrace the web of the shoe 28a and are in end contact with the opposite forks 108 of the lever 110, which also straddles the web of shoe 28a. Referring to Figure 6, it will be seen that a pull exerted on the lower end of lever 110 by means of a cable 112 will cause the portion 114 of the lever which joins the forks 108 to pivot on shoe 28a at 116 and exert a pressure against the end 118 of the slotted plunger 106 tending to move the plunger to the left. Thus the inner end of this plunger acts through piston 120 on shoe 30a, while the junction 114 acts against shoe 28a, spreading the upper ends of the shoes, while the lower ends of the shoes anchor on member 36a. This is for parking or emergency actuation only. In normal or service application of the brakes the mode of actuation is the same as that described in connection with the device of Figures 1 to 5 inclusive.

From the preceding description, it will be apparent that we have provided a brake structure which is improved both in having anchoring torque of the shoes transmitted to the supporting spider centrally thereof, and in utilizing a simplified structure for accomplishing the foregoing objects. The number of component parts of the brake assembly has been materially reduced, thus simplifying manufacture of the structure.

Although particular embodiments of our invention have been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. A brake torque-taking structure comprising a plate-like member having a flat central portion adapted to be secured to a fixed member and having a peripheral recess, the bottom surface of the recess being substantially level at the center and substantially arcuately curved at both ends, an inverted cradle member having a substantially flat central portion and slightly inwardly curved end portions, said inverted cradle being normal to the plane of the plate-like member and supported thereon, the axially central portion of the inverted cradle being positioned in the recess of the plate-like member and secured to said plate-like member, said inverted cradle being provided with a slot at each end to embrace the plate-like member at the edge of the recess, the inverted cradle being prevented from movement relative to the plate-like member by being directly secured thereto, by the ends of the recess, and by the curved end portions of said cradle member braced against said plate-like member.

2. A brake torque-taking structure comprising a plate-like stamping having a flat central disk portion adapted to be secured to a fixed member, said stamping having a peripheral recess, the bottom surface of the recess being substantially level at the center and substantially arcuately curved at both ends, a second stamping having substantially flat central portions and slightly inwardly curved end portions, said second stamping being normal to the plane of the first stamping and supported thereon, the axially central portion of the second stamping being positioned in the peripheral recess of the first stamping and welded to said first stamping, said second stamping being provided with a slot at each end to embrace the first stamping at the edge of the recess, the second stamping being prevented from movement relative to the first stamping by the welds, by the ends of the recess, and by the curved end portions of said second stamping braced against said first stamping.

3. A brake torque-taking structure comprising a plate-like stamping having a flat central disk portion adapted to be secured to a fixed member, said stamping having a peripheral recess, a second stamping having a substantially flat central portion adapted to support a brake actuator or anchor, the axially central portion of the second stamping being positioned in the recess of the first stamping and being secured to said first stamping.

4. A brake torque-taking member constituted by a stamping having a flat central disk portion adapted to be secured to a fixed member and having two peripheral extensions, one turned inwardly to form a flange normal to the plane of the central disk portion, and the other turned outwardly to form a flange normal to the plane of the central disk portion, an anchor member, said two flanges serving as the support for said anchor member having its longitudinal center line in the plane of the central disk portion of the stamping.

5. A drum brake comprising a plate-like stamping having a central disk portion lying flat against an annular flange on a fixed member to which the stamping is secured, said stamping having four substantially radially extending arms offset axially from the central portion, two of said arms being axially offset in one direction and the other two being axially offset in the opposite direction, a second stamping secured to the periphery of the plate-like stamping and extending normal to the plane of the plate-like stamping thereby providing a support surface of substantially enlarged width centrally supported on the plate-like stamping, an actuator secured to and supported on said second stamping and having its longitudinal axis lying in the center plane of said plate-like stamping, two opposed pistons in said actuator adapted to exert a spreading force against brake shoes associated therewith, each of said pistons having a slot in its outer end, two arcuate T-section shoes having their webs lying in the plane of the central disk portion of the plate-like stamping and each guided between two of the arms on said plate-like stamping and in the slot provided in the end of one of said pistons, said guiding arms of the plate-like stamping being located at approximately the center of the respective shoes, each of said shoes when anchored exerting axially centered force on said plate-like stamping.

6. A drum brake comprising a plate-like stamping having a central disk portion lying flat against an annular flange on a fixed member to which the stamping is secured, said stamping having four substantially radially extending arms offset axially from the central portion, two of said arms being axially offset in one direction and the other two being axially offset in the opposite direction, a second stamping secured to the periphery of the plate-like stamping and extending normal to the plane of the plate-like stamping thereby providing a support surface of substantially enlarged width centrally supported on the plate-like stamping, a combined actuator and anchor member secured to and supported on said second stamping and having its longitudinal axis lying in the center plane of said plate-like stamping, two opposed pistons in said actuator adapted to exert a spreading force against brake shoes associated therewith, each of said pistons having a slot in its outer end, two arcuate T-section shoes having their webs lying in the plane of the central disk portion of the plate-like stamping and each adapted to anchor at times through said anchor member, said shoe webs being each guided between two of the arms on said plate-like stamping and in the slot provided in the end of one of said pistons, said guiding arms of the plate-like stamping being located at approximately the center of the respective shoes, each of said shoes when anchored exerting axially centered force on said plate-like stamping.

7. A drum brake comprising a plate-like stamping having a flat central disk portion adapted to be secured to a fixed member, said stamping having at least two substantially radially extending arms offset axially from the central portion one of said arms being axially offset in one direction and the other being axially offset in the opposite direction, a second stamping secured to the periphery of the plate-like stamping and extending normal to the plane of the plate-like stamping, thereby providing a support surface of substantially enlarged width centrally supported on the plate-like stamping, an anchor member secured to and supported on said second stamping, an arcuate T-section shoe having its web lying in the plane of the central disk portion of the plate-like stamping and adapted to anchor on said anchor member, said shoe web being guided between the arms on said plate-like stamping, said shoe when anchored exerting axially centered force on said plate-like stamping.

8. A drum brake structure comprising a plate-like stamping having a planar central portion and adapted to be secured to a fixed member, a second stamping secured to the periphery of the plate-like stamping and extending normal to the plane of the plate-like stamping, thereby providing a support surface of substantially enlarged width centrally supported on the plate-like stamping, an actuator secured to and supported on said second stamping and having its longitudinal axis lying in the plane of the central portion of said plate-like stamping, and an arcuate T-section shoe having its web lying in the plane of the central portion of the plate-like stamping, said shoe when anchored exerting axially centered force on said plate-like stamping.

9. A drum brake structure comprising a plate-like stamping having a planar central portion and adapted to be secured to a fixed member, a second stamping secured to the periphery of the plate-like stamping and extending normal to the plane of the plate-like stamping, thereby providing a support surface of substantially enlarged width centrally supported on the plate-like stamping, an anchor member secured to and supported on said second stamping, and an arcuate T-section shoe having its web lying in the plane of the central portion of the plate-like stamping and adapted to anchor on said anchor member, said shoe when anchored exerting axially centered force on said plate-like stamping.

10. A drum brake structure comprising a supporting spider having a planar central portion adapted to be secured to a fixed member, said spider having four substantially radially extending arms offset axially from the planar central portion, two of said arms being axially offset in one direction and the other two being axially offset in the opposite direction, two combined actuator and anchor members secured to and supported by said spider and having their longitudinal axes lying in the plane of said central portion of the spider, two pistons in each of said actuators adapted to exert a spreading force against brake shoes associated therewith, each of said pistons having a slot in its outer end, two arcuate T-section shoes having their webs lying in the plane of the central portion of the spider and each guided between two of the arms on said plate-like stamping and in the slots provided in the ends of said pistons, said guiding arms of the spider being located at approximately the center of the respective shoes, each of said shoes when anchored exerting axially centered force on the planar central portion of said spider.

11. Actuating means for spreading the ends of a pair of shoes comprising a casing located between the shoes and having a cylindrical bore, two pistons reciprocable in said bore and operatively associated with the respective shoes, hydraulic means for spreading said pistons to spread the ends of the shoes, a thrust member extending through one of said pistons to contact the inner end of the other piston, a lever pivoted on one of the shoes and pivotally connected to the outer end of said thrust member, and means for moving the lever to spread the ends of the shoes.

12. Actuating means for spreading the ends of a pair of shoes comprising a casing located between the shoes and having a cylindrical bore, two pistons reciprocable in said bore and operatively associated with the respective shoes, hydraulic means for spreading said pistons to spread the ends of the shoes, a plunger extending through one of said pistons to contact the inner end of the other piston, the outward movement of the plunger with respect to the piston through which it extends being limited by contact of a portion of the plunger with a portion of the piston, a lever pivoted on one of the shoes and pivotally connected to the outer end of the plunger, and means for moving the lever to spread the ends of the shoes.

13. In a brake comprising a drum, a shoe-supporting spider having a planar central portion adapted to be secured to a fixed member, and two arcuate T-section shoes having their webs lying in the plane of the central portion of the spider, actuating means for spreading the ends of said shoes comprising a casing located between the shoes and having a cylindrical bore, two pistons reciprocable in said bore and operatively associated with the respective shoes, hydraulic means for spreading said pistons to spread the ends of the shoe, a plunger extending through one of said pistons to contact the inner end of the other piston, a lever pivoted on one of the shoes and pivotally connected to the outer end of the plunger, and means for moving the lever to spread the ends of the shoes.

14. In a brake comprising a drum, a shoe-supporting spider having a planar central portion adapted to be secured to a fixed member, and two arcuate T-section shoes having their webs lying in the plane of the central portion of the spider, actuating means for spreading the ends of said shoes comprising a casing located between the shoes and having a cylindrical bore, two pistons reciprocable in said bore and operatively associated with the respective shoes, hydraulic means for spreading said pistons to spread the ends of the shoes, a thrust member extending through one of said pistons to contact the inner end of the other piston, the outward movement of the thrust member with respect to the piston through which it extends being limited by contact of a portion of said thrust member with a portion of the piston, a lever pivoted on one of the shoes and pivotally connected to the outer end of the thrust member, and means for moving the lever to spread the ends of the shoes.

15. A brake torque-taking member constituted by a stamping having a flat central disk portion adapted to be secured to a fixed member and having two peripheral extensions, one turned inwardly to form a flange normal to the plane of the central disk portion, and the other turned outwardly to form a flange normal to the plane of the central disk portion, an actuator, said two flanges serving as the support for said actuator having its longitudinal center line in the plane of the central disk portion of the stamping.

16. A drum brake structure comprising a supporting plate having a laterally offset shoe-guiding arm, a T-section shoe mounted on the supporting plate and having a rim and a web, the web of said shoe lying in the plane of said supporting plate, actuators, one at each end of the shoe, each of said actuators having a reciprocable member therein provided with a slot in its outer end into which the respective end of the shoe web extends, said shoe being held in position laterally by means of engagement with the guiding arm of the supporting plate and by having its ends guided as aforesaid in the slots of the respective reciprocable members, and spring means acting on said shoe to urge it to retracted position, said spring means exerting force along a line offset from the plane of the shoe web so as to cause the spring force to maintain the shoe in engagement with said guiding arm.

RUDOLPH A. GOEPFRICH.
BRYAN E. HOUSE.

REFERENCES CITED

The following references are of record in the file of this patent:

UNITED STATES PATENTS

| Number | Name | Date |
| --- | --- | --- |
| 2,071,144 | Sneed | Feb. 16, 1937 |
| 2,124,949 | Hollerith | July 26, 1938 |
| 2,171,289 | Eakin | Aug. 29, 1939 |
| 2,212,934 | Gates | Aug. 27, 1940 |
| 2,214,911 | Shinn | Sept. 17, 1940 |
| 2,245,682 | Kerr | June 17, 1941 |
| 2,247,374 | Hawley | July 1, 1941 |
| 2,291,012 | Watts | July 28, 1942 |
| 2,313,432 | Goepfrich | Mar. 9, 1943 |
| 2,322,121 | Frank | June 15, 1943 |
| 2,372,415 | Eksergian | Mar. 27, 1945 |
| 2,374,651 | Chouings | May 1, 1945 |

Certificate of Correction

Patent No. 2,475,492

July 5, 1949

RUDOLPH A. GOEPFRICH ET AL.

It is hereby certified that error appears in the printed specification of the above numbered patent requiring correction as follows:

Column 9, line 25, for the word "shoe" read *shoes*;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*